(12) United States Patent
Itkowitz et al.

(10) Patent No.: US 11,260,535 B2
(45) Date of Patent: *Mar. 1, 2022

(54) GEOMETRICALLY APPROPRIATE TOOL SELECTION ASSISTANCE FOR DETERMINED WORK SITE DIMENSIONS

(71) Applicant: Intuitive Surgical Operations, Inc, Sunnyvale, CA (US)

(72) Inventors: Brandon D. Itkowitz, San Jose, CA (US); Simon P. DiMaio, San Carlos, CA (US); Craig R. Gerbi, Half Moon Bay, CA (US); Theodore W. Rogers, Alameda, CA (US); Wenyi Zhao, Weston, FL (US)

(73) Assignee: Intuitive Surgical Operations, Inc., Sunnyvale, CA (US)

( * ) Notice: Subject to any disclaimer, the term of this patent is extended or adjusted under 35 U.S.C. 154(b) by 31 days.

This patent is subject to a terminal disclaimer.

(21) Appl. No.: 16/827,227

(22) Filed: Mar. 23, 2020

(65) Prior Publication Data

US 2020/0215696 A1 Jul. 9, 2020

Related U.S. Application Data

(63) Continuation of application No. 15/972,643, filed on May 7, 2018, now Pat. No. 10,611,033, which is a continuation of application No. 15/178,858, filed on Jun. 10, 2016, now Pat. No. 9,987,751, which is a continuation of application No. 14/210,881, filed on Mar. 14, 2014, now Pat. No. 9,375,844.

(Continued)

(51) Int. Cl.
*G06K 9/00* (2006.01)
*B25J 9/16* (2006.01)

(52) U.S. Cl.
CPC .................. *B25J 9/1697* (2013.01)

(58) Field of Classification Search
CPC ...................................... B25J 9/1697
See application file for complete search history.

(56) References Cited

U.S. PATENT DOCUMENTS

| 4,942,539 A | 7/1990 | McGee et al. |
| 5,354,314 A | 10/1994 | Hardy et al. |

(Continued)

OTHER PUBLICATIONS

Mitchell et al, ("Optimization of a Spherical Mechanism for a Minimally Invasive Surgical Robot: Theoretical and Experimental Approaches", IEEE Transactions on biomedical engineering, vol. 53, No. 7, Jul. 2006 (Year: 2006).*

(Continued)

*Primary Examiner* — Amara Abdi
(74) *Attorney, Agent, or Firm* — Schwegman Lundberg & Woessner, P.A.

(57) ABSTRACT

A robotic system includes a processor that is programmed to determine and cause work site measurements for user specified points in the work site to be graphically displayed in order to provide geometrically appropriate tool selection assistance to the user. The processor is also programmed to determine an optimal one of a plurality of tools of varying geometries for use at the work site and to cause graphical representations of at least the optimal tool to be displayed along with the work site measurements.

20 Claims, 7 Drawing Sheets

Related U.S. Application Data

(60) Provisional application No. 61/793,354, filed on Mar. 15, 2013.

(56) References Cited

U.S. PATENT DOCUMENTS

| | | | |
|---|---|---|---|
| 6,309,397 | B1 | 10/2001 | Julian et al. |
| 6,424,885 | B1 | 7/2002 | Niemeyer et al. |
| 6,522,906 | B1* | 2/2003 | Salisbury, Jr ......... A61B 1/313 600/102 |
| 6,659,939 | B2 | 12/2003 | Moll et al. |
| 7,280,633 | B2 | 10/2007 | Cheng et al. |
| 7,785,320 | B2 | 8/2010 | Wang et al. |
| 9,089,256 | B2 | 7/2015 | Tognaccini et al. |
| 9,375,844 | B2 | 6/2016 | Itkowitz et al. |
| 9,987,751 | B2 | 6/2018 | Itkowitz et al. |
| 2002/0012460 | A1 | 1/2002 | Kochi et al. |
| 2008/0107306 | A1 | 5/2008 | Matsuzawa |
| 2009/0088897 | A1* | 4/2009 | Zhao ................. G06K 9/3216 700/250 |
| 2009/0248036 | A1 | 10/2009 | Hoffman et al. |
| 2009/0326318 | A1* | 12/2009 | Tognaccini ............ A61B 34/37 600/104 |
| 2010/0164950 | A1 | 7/2010 | Zhao et al. |
| 2010/0290674 | A1 | 11/2010 | Kim |
| 2010/0332033 | A1 | 12/2010 | Diolaiti et al. |
| 2018/0250828 | A1 | 9/2018 | Itkowitz et al. |

OTHER PUBLICATIONS

Kim, Miriam et al., "Computer Assisted 3D Measurements for Micro-Surgery," Proceedings of the Human Factors and Ergonomics Society 41st Annual Meeting, 1997, pp. 787-791, Human Factors and Ergonomics Society.

Lum, Mitchell, Jay, Hiroshi et al., "Kinematic Optimization of a Spherical Mechanism for a Minimally Invasive Surgical Robot," IEEE International Conference on Robotics and Automation, 2004, pp. 829-834, vol. 1, IEEE.

Rosen, Jacob et al., "Spherical Mechanism Analysis of a Surgical Robot for Minimally Invasive Surgery Analytical and Experimental Approaches," Studies in Health Technology and Informatics—Medicine Meets Virtual Reality (MMVR), 2005, vol. 111, pp. 422-428, IOS Press.

Scharstein D., et al., "High-Accuracy Stereo Depth Maps Using Structured Light," IEEE Computer Society Conference on Computer Vision and Pattern Recognition, 2003, vol. 1, pp. 195-202.

Vertut, Jean and Phillipe Coiffet, Robot Technology: Teleoperation and Robotics Evolution and Development, English translation, Prentice-Hall, Inc., Inglewood Cliffs, NJ, USA 1986, vol. 3A, 332 pages.

* cited by examiner

GEOMETRICALLY APPROPRIATE TOOL SELECTION ASSISTANCE FOR DETERMINED WORK SITE DIMENSIONS

CROSS REFERENCE TO RELATED APPLICATIONS

This application is a continuation of U.S. application Ser. No. 15/972,643, filed May 7, 2018, which is a continuation of U.S. application Ser. No. 15/178,858, filed Jun. 10, 2016, now U.S. Pat. No. 9,987,751, which is a continuation of U.S. application Ser. No. 14/210,881, filed Mar. 14, 2014, now U.S. Pat. No. 9,375,844, which claims benefit of priority from U.S. Application No. 61/793,354, filed Mar. 15, 2013, each of which is incorporated herein by reference.

FIELD OF THE INVENTION

The present invention generally relates to robotic systems. In particular, it relates to a robotic system, and method implemented therein, for geometrically appropriate tool selection assistance for determined work site dimensions.

BACKGROUND

U.S. Pat. No. 8,100,133 describes a robotic system in which indicators are provided to communicate which tool currently mounted on a robotic system is to be removed and which replacement tool currently available for mounting is to take its place. In this system, replacement tools are chosen for their functionality, so there is generally no uncertainty in which replacement tool of a number of candidate replacement tools is to be selected.

Robotic systems may also be equipped, however, with a tool which is selected from a number of tools of varying geometries for use at a work site. When the work site dimensions are not precisely known, selection of an appropriate tool may be subjectively made based upon a visual estimate of the work site dimensions. If the visual estimate is inaccurate, then the selected tool may need to be replaced by another tool, thus causing delay in the performance of work activity performed by the robotic system.

Further, during the performance of robotic activity at the work site, the work space within the work site may change for various reasons such as the movement of objects within the work site. In this case, a tool currently mounted on the robotic system may need to be replaced, not for functionality reasons, but for geometry reasons. In particular, a longer or shorter tool may be required for optimal performance within the changed work site space. Thus, an initially mounted tool may need to be replaced by a geometrically appropriate tool which is better suited for the work site dimensions, thereby causing further delay in the performance of work activity performed by the robotic system.

BRIEF SUMMARY

The embodiments of the invention are summarized by the claims that follow below.

DETAILED DESCRIPTION

Figure 1:
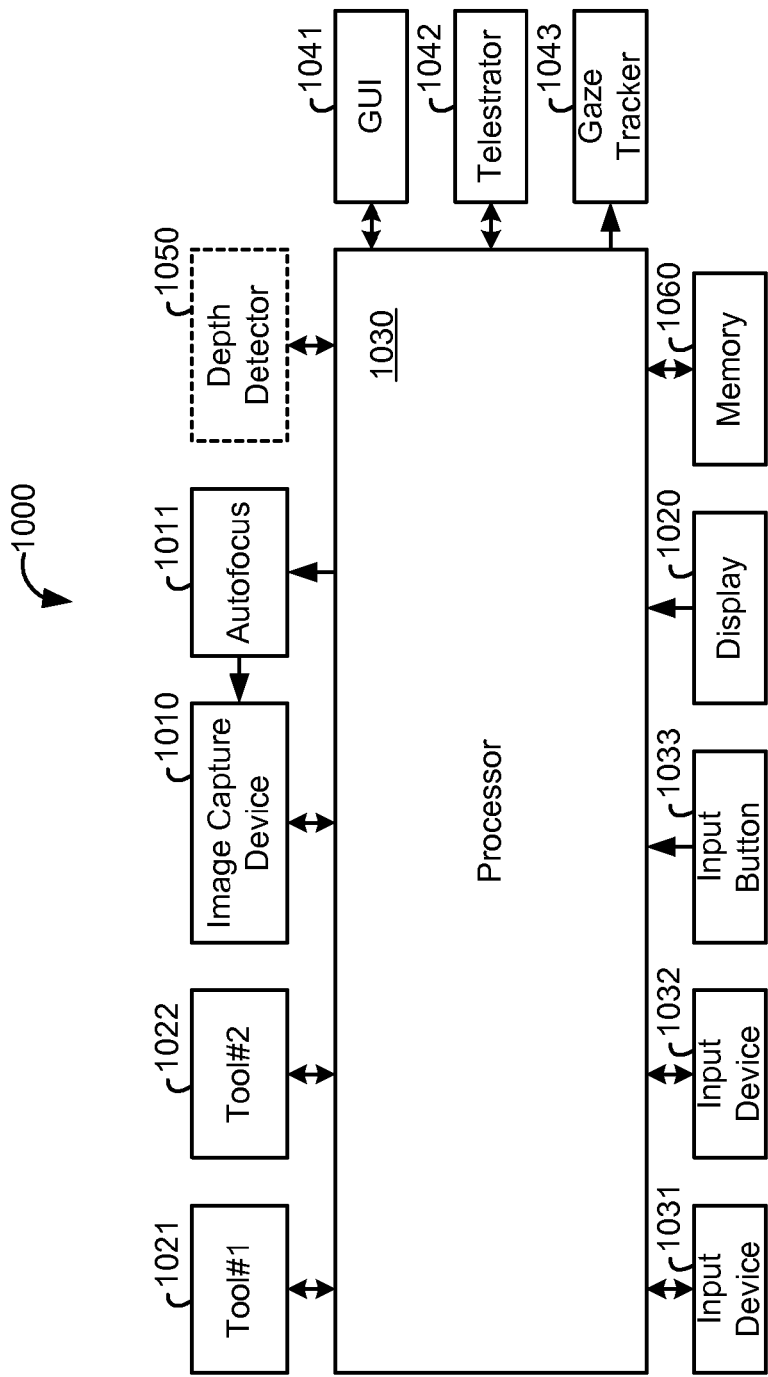
FIG. 1 illustrates a block diagram of robotic system utilizing aspects of the present invention.

FIG. 1 illustrates, as an example, a block diagram of a robotic system 1000. An image capture device 1010 is preferably a high-definition digital stereo camera that generates a video stream of stereo images captured at a frame rate of the camera, such as thirty frames per second. Each frame of stereo images includes a left stereo image and a right stereo image.

A processor 1030 is programmed to process images received from the image capture device 1010 and cause the processed images to be displayed on a display 1020. The display 1020 is preferably a stereo viewer having left and right display screens for respectively displaying left and right stereo images derived from the left and right stereo images captured by the image capture device 1010.

Input devices 1031, 1032 and an input button 1033 are provided to facilitate user interaction with the robotic system 1000. The input devices 1031, 1032 may be any conventional computer input device such as a joystick, computer mouse, keyboard, microphone, or digital pen and pad, which may be used alone or as part of a user interface system such as a Graphical User Interface (GUI) 1041 and a telestrator 1042. The input button 1033 may be disposed on or adjacent to one of the input devices 1031, 1032 and used as a conventional switch or clicking device. The input button 1033 may also be used alone or as part of a user interface system such as the GUI 1041, telestrator 1042, and a gaze tracker 1043.

Tools 1021, 1022 are provided so that they may interact with objects at a work site. Individual of the tools 1021, 1022 and the image capture device 1010 may be robotically manipulated using robot arms or slave manipulators (not shown) under the control of the processor 1030 in response to user interaction with the input devices 1031, 1032. Alternatively or additionally, individual of the tools 1021, 1022 and the image capture device 1010 may be manually manipulated by a user of the robotic system 1000. Although only two tools are shown in the figure, it is to be appreciated that more or less tools may be employed in the robotic system 1000, depending upon what is needed at the time for interacting with objects in a work site.

A depth detector 1050 may also be optionally included in the robotic system 1000 to determine depth values for user specified points relative to an image capturing perspective (e.g., image capturing end) of the image capture device 1010. The depth values in this case are distances from the user specified points to an image capturing end of the image capture device 1010. There are a number of ways the depth detector 1050 may be configured to determine such depth values. As an example, a structured light technique may be used by the depth detector 1050 in which a known light pattern is projected onto a scene, which includes the user specified point, and the relative light intensities on the scene tracked by sensors in the depth detector 1050 to derive a depth map for the scene. See, e.g., Daniel Scharstein and Richard Szeliski, "High-Accuracy Stereo Depth Maps Using Structured Light," IEEE Computer Society Conference on Computer Vision and Pattern Recognition (CVPR 2003), vol. 1, pages 195-202, Madison, Wis., June 2003. As another example, a laser range finder may alternatively be included in the depth detector 1050 for determining depth values of a three-dimensional scene.

An autofocus unit 1011 performs an automatic focusing function on the image capture device 1010 as a function of the depth values for a scene. The scene may be defined in this case by a region of interest which may be predefined or specified by the user of the system 1000 using, for example, the GUI 1041, the telestrator 1042, or the gaze tracker 1043.

Additional details on a telestrator such as the telestrator 1042 may be found, for example, in U.S. 2007/0156017 entitled "Stereo Telestration for Robotic Surgery", which is incorporated herein by reference. Additional details on such a gaze tracker such as the gaze tracker 1043 may be found, for example, in U.S. Application No. 61/554,741 entitled "Method and System for Stereo Gaze Tracking", which is incorporated herein by reference.

The processor 1030 performs various functions in the robotic system 1000. As previously mentioned, it controls robotic operation of the tools 1021, 1022 and the image capture device 1010 in response to user interaction with associated input devices, such as the input devices 1031, 1032. The processor 1030 also may be used to perform various methods described herein. Although described as a processor, it is to be appreciated that the processor 1030 may be implemented by any combination of hardware, software, and firmware. Also, its functions as described herein may be performed by one unit or divided up among different components, each of which may be implemented in turn by any combination of hardware, software, and firmware. The robotic system 1000 may be used in various applications. As one example, aspects of the robotic system 1000 may be used as a medical robotic system such as described in U.S. Pat. No. 6,659,939 entitled "Cooperative Minimally Invasive Telesurgical System," which is incorporated herein by reference.

Figure 2:
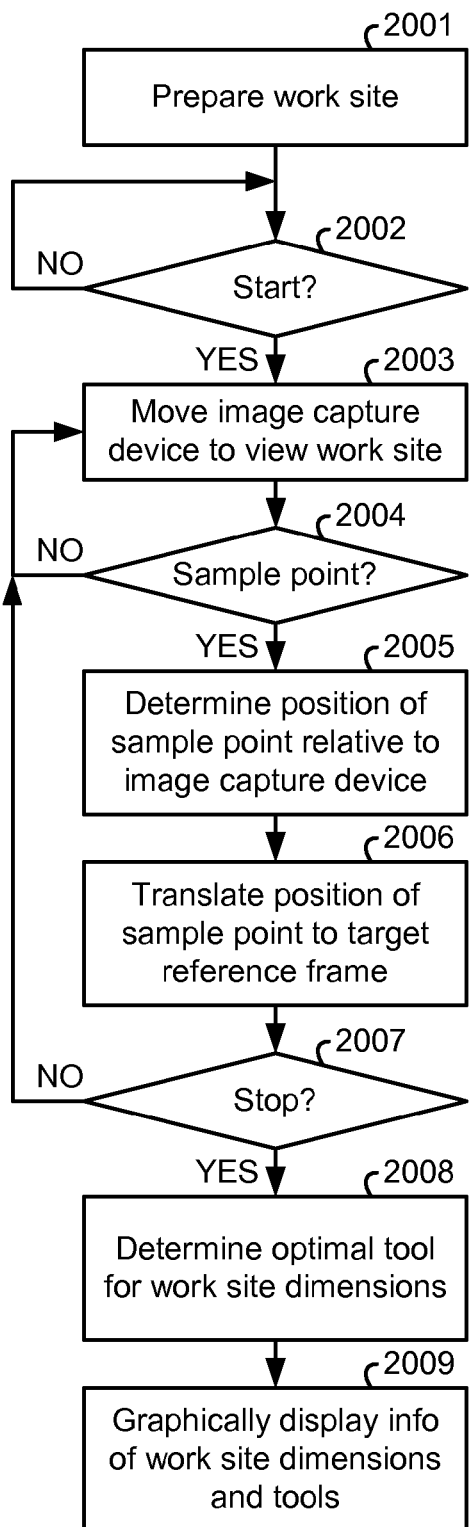
FIG. 2 illustrates a flow diagram of a first method utilizing aspects of the present invention for providing geometrically appropriate tool selection assistance for determined work site dimensions.

FIG. 2 illustrates, as an example, a flow diagram of a method for providing work site measurements. Program code implementing various blocks of the method is stored non-transitorily in memory 1060 and executed by the processor 1030.

Figure 4:
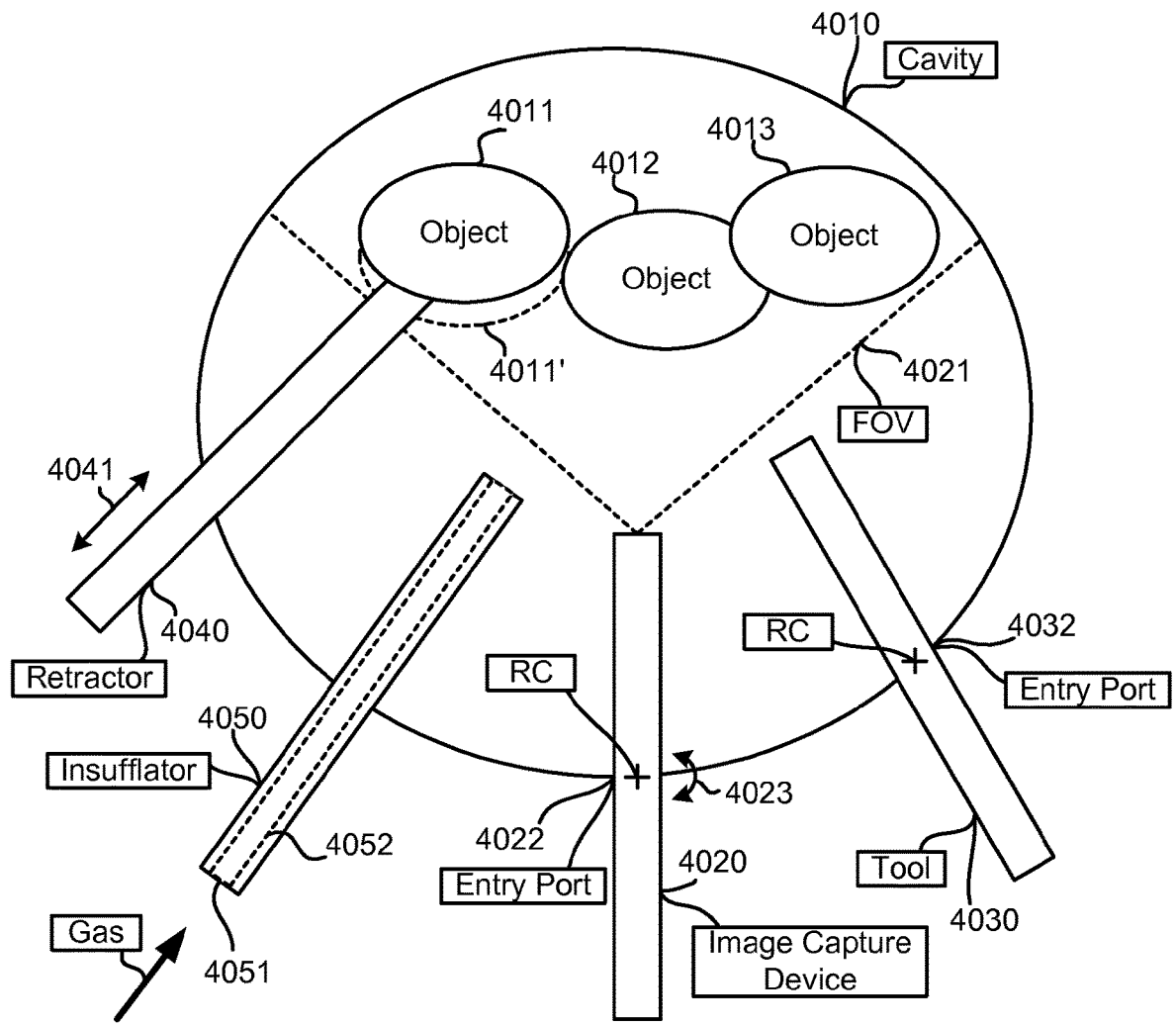
FIG. 4 illustrates a schematic of a cavity-shaped work site with tools which may be manipulated by a robotic system utilizing aspects of the present invention.

In block 2001, the method may optionally be initiated by a user preparing the work site. As an example, FIG. 4 illustrates a simplified work site that is configured in the shape of a cavity 4010 having entry ports such as entry ports 4022, 4032. Within the work site are objects 4011, 4012, 4013 which may be manipulated or otherwise interacted with by tools, such as tools 4030, 4040, 4050 (each of which may be one of the tools 1021, 1022 of FIG. 1), while images of the work site are being captured by one or more image capture devices, such as image capture device 4020 (which may be the image capture device 1010 of FIG. 1). In this example, prior to the tool 4030 interacting with one or more of the objects 4011, 4012, 4013, the work site may be prepared for such interaction by, for example, the tool 4040 acting as a retractor to move object 4011 from an initial location indicated by dotted-lined object 4011' to a retracted position indicated by solid-lined object 4011. In this case, the retractor 4040 may be robotically or manually moved in the directions indicated by double-headed arrow 4041. As another example, the work site may also be prepared for interaction by, for example, the tool 4050 acting as an insufflator to expand or insufflate the cavity by injecting gas into a proximal end 4051 and through an inner channel 4052 of the tool 4050 into the cavity 4010. As may be appreciated, such preparations of the work site may affect the work site dimensions relative to a perspective of the image capture device 4020.

In block 2002, the method determines whether or not work site measurements are to start. The user may turn on and off work site measurement processing in any one of a number of conventional ways such as turning a switch, such as the input button 1033, to ON and OFF positions. Alternatively, the user may use voice commands spoken into a voice recognition system to turn the processing ON and OFF. If the determination in block 2002 is NO, then the method continuously loops through block 2002 each process cycle until an affirmative determination is made. Upon making a YES determination in block 2002, the method proceeds to block 2003.

In block 2003, the user causes the image capture device to move or pivot about a point so that its captured images sweep the work site. To do this, the image capture device may be robotically or manually moved. As an example, FIG. 4 illustrates an image capture device 4020 that may pivoted (as indicated by double-headed arrow 4023) about a point referred to as a Remote Center (RC) at the entry port 4022 to the work site cavity 4010, so that its image capturing end may scan the work site area. This results in the user reorienting the Field of View (FOV) 4021 of the image capture device so that it captures images of objects that may otherwise be outside an initial FOV 4021.

In block 2004, the method determines whether a point on a surface of an object in the work space that is currently intersected by a central axis of the FOV 4021 is to be included as a user specified sample point. The user may specify this point to be a sample point by, for example, depressing the input button 1033, so that the determination of whether or not the point is to be included as a user specified sample point may be made by determining whether or not the input button 1033 is being depressed at the time. If the determination in block 2004 is NO, then the method jumps back to block 2003 so that the position of the image capture device for the next process period may be processed. On the other hand, if the determination in block 2004 is YES, then the method proceeds to block 2005.

In block 2005, the method determines the position of the user specified sample point relative to an image capturing end of the image capture device. The position in this case may be determined from a depth measurement of the user specified sample point, which is a distance to the user specified sample point from the image capturing perspective of the image capture device. The determination of the depth to the user specified point may be performed using the depth detector 1050. Alternatively, the depth may be determined by determining corresponding points in stereo images using a robust sparse image matching algorithm, determining disparities between the corresponding points, and converting the disparities to depths using a predetermined disparity to depth mapping. See, e.g., U.S. Pat. No. 8,184,880 entitled "Robust Sparse Image Matching for Robotic Surgery", which is incorporated herein by reference. In this latter case, the depth may be determined by the processor 1030 so that the depth detector 1050 is not necessarily included in the robotic system 1000.

In block 2006, the method translates the position of the user specified point relative to the image capturing end of the image capture device to another reference frame associated with a tool entry port into the work site. The translation may involve the use of one or more reference frame transforms.

Figure 5:
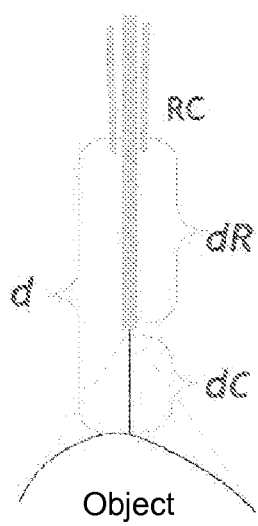
FIG. 5 illustrates a schematic of a zero-degree angle image capture device usable in a robotic system utilizing aspects of the present invention.
Figure 6:
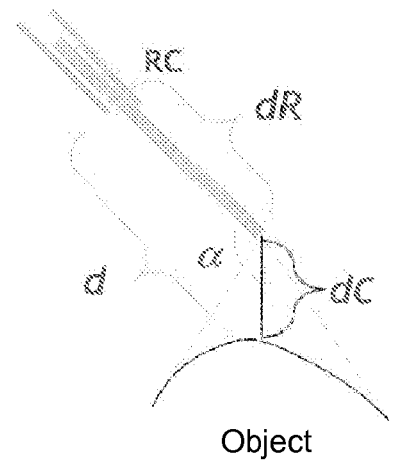
FIG. 6 illustrates a schematic of a thirty-degree angle image capture device usable in a robotic system utilizing aspects of the present invention.

As an example, referring to FIGS. 4-6, two reference frame transforms may be used to translate the position of a point on an object relative to a reference frame defined at the distal tip of the image capture device (referred to herein as the "tip" reference frame) to a reference frame defined at a Remote Center (RC) for a tool (referred to herein as the "RCT" reference frame). The RC point for the tool serves as a control reference point for the tool. It is a point about which the tool is manipulatable by its robotic arm. The "tip" reference frame is disposed and oriented so as to be from the image capturing perspective of the image capture device. For example, referring to FIG. 5, for a zero-degree angle image capture device, the z-axis of the tip reference frame is coincident with a central axis of a shaft of the image capture device. As another example, referring to FIG. 6, for a thirty-degree angle image capture device, the z-axis of the tip reference frame is at an angle $\alpha$ (e.g., 150 degrees) from the central axis of the shaft of the image capture device. In either case, the depth "dC", as shown in FIGS. 5 and 6, to the point on the object is measured along the z-axis of the "tip" reference frame.

Now continuing with the example, a first reference frame transform $^{RCI}_{tip}T$ maps points in the tip reference frame to a Remote Center (RC) reference frame of the image capture device (referred to herein as the "RCI" reference frame). The RC point for the image capture device serves as a control reference for the image capture device. It is a point about which the image capture device is manipulatable by its robotic arm. As shown in FIGS. 5 and 6, the transform $^{RCI}_{tip}T$ is readily determinable from the known dimensions and geometry of the image capture device. A second reference frame transform $^{RCT}_{RCI}T$ then maps points from the RCI reference frame to the RCT reference frame of the tool.

Figure 7:
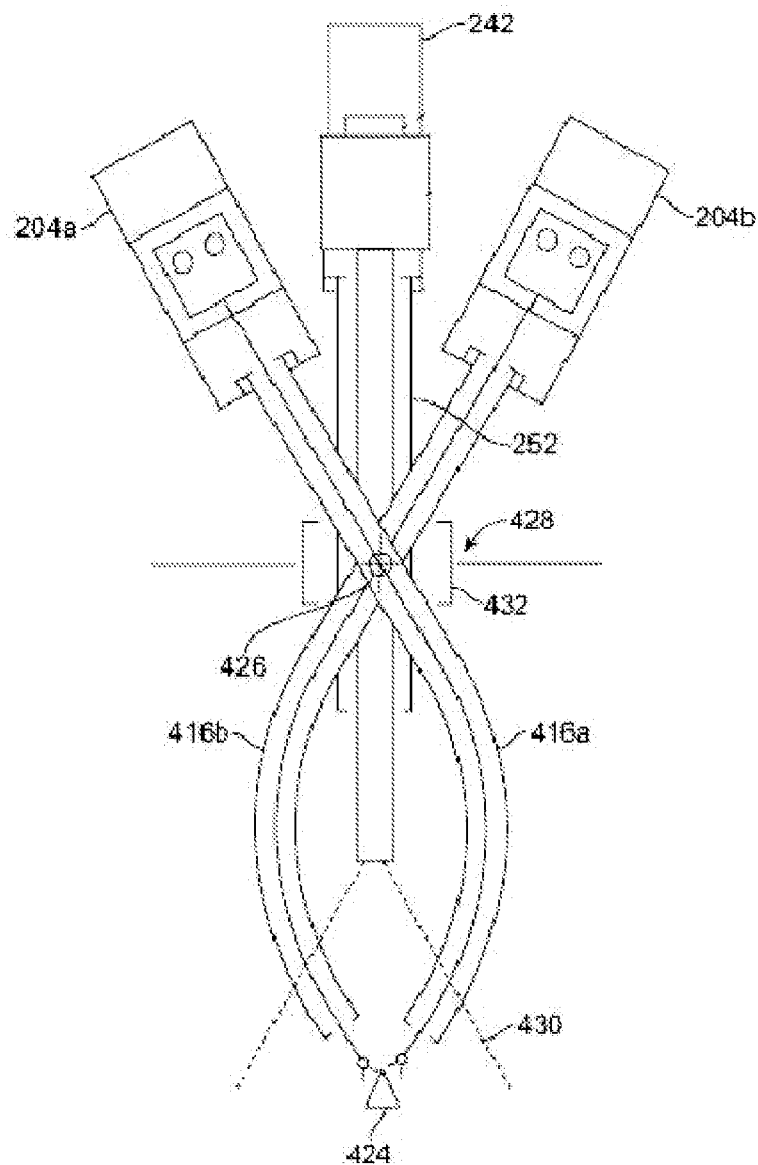
FIG. 7 illustrates a schematic of an image capture device and tools inserted through a common entry port as usable in a robotic system utilizing aspects of the present invention.

When the RC point for the image capture device and the RC point for the tool are at the same location, such as shown in FIG. 7, this may be a simple matter of determining the different orientations for the two reference frames. The origin of the two reference frames is the same RC point designated by the reference number 426. In FIG. 7, each curved cannula 416a, 416b may be considered a "tool" which in turn, delivers an instrument to a work site so that it may interact with an object 424 at the work site. At the proximal end of each cannula, an interface 204a, 204b is provided to couple the cannula and its respective instrument to a corresponding slave manipulator or robotic arm. An image capture device 252 is also shown having a Field of View (FOV) 430 which covers the working ends of the instruments as they interact with the object 424. At the proximal end of the image capture device 252, an interface 242 is provided to couple the image capture device to its slave manipulator or robotic arm. A support 423 is provided to provide support for the image capture device 252, cannula 416a, and cannula 416b at the common entry port 428.

On the other hand, when the RC point for the image capture device and the RC point for the tool are at different locations, such as shown in FIG. 4, a slightly more complex calculation is involved. In this case, both the RC reference frames for the image capture device and the tool may be determined relative to a world reference frame, e.g., $^R_{World}c_IT$ and $_{World}^{RCT}T$. Once those transforms are determined, then it is straightforward to determine the transform for the RC reference frame of the image capture device to the RC reference frame for the tool, e.g., $^{RCT}_{RCI}T = _{World}^{RCT}T \times ^{World}_{RCI}T$.

Additional details on such reference frames and reference frame transformations may be found, for example, in U.S. 2012/0290134 entitled "Estimation of a Position and Orientation of a Frame used in Controlling Movement of a Tool" filed Jan. 27, 2012, which is incorporated herein by reference.

In block 2007, the method determines whether or not work site measurements are to stop. As previously explained in reference to block 2002, the user may turn on and off work site measurement processing in any one of a number of conventional ways such as turning a switch, such as the input button 1033, to ON and OFF positions. Alternatively, the user may use voice commands spoken into a voice recognition system to turn the processing ON and OFF. If the determination in block 2007 is NO, then the method jumps back to block 2003 to process information for a next process cycle. On the other hand, if the determination in block 2007 is YES, the method proceeds to block 2008.

In block 2008, the method determines an optimal tool for use in the work site based upon the work site measurements and the geometries of candidate tools. For example, a plurality of tools of varying geometries (e.g., lengths and curvatures) may be compared to the work site measurements as determined for the user specified sample points. To determine the optimal tool, a number of different algorithms may be used. The selection of which algorithm to use may be based upon the specific application of the tool (e.g., its intended interaction with one or more objects in the work site).

As an example, a minimum depth among the depths for a plurality of user specified sample points may be compared against an unextended length of each of the candidate tools. Candidate tools having an unextended length greater than the minimum depth may be eliminated from consideration and one or more selection criteria may be used to determine the optimal one among the remaining candidate tools. For example, a middle-sized one of the candidate tools may be chosen. As another example, an average depth among the depths for the plurality of user specified sample points may be compared against the unextended length of each of the candidate tools. As another example, a maximum depth among the depths for the plurality of user specified sample points may be compared against an extended length of each of the candidate tools. In this case, candidate tools having an extended length less than the maximum depth may be eliminated from consideration and one or more selection criteria may be used to determine the optimal one among the remaining candidate tools.

Figure 8:
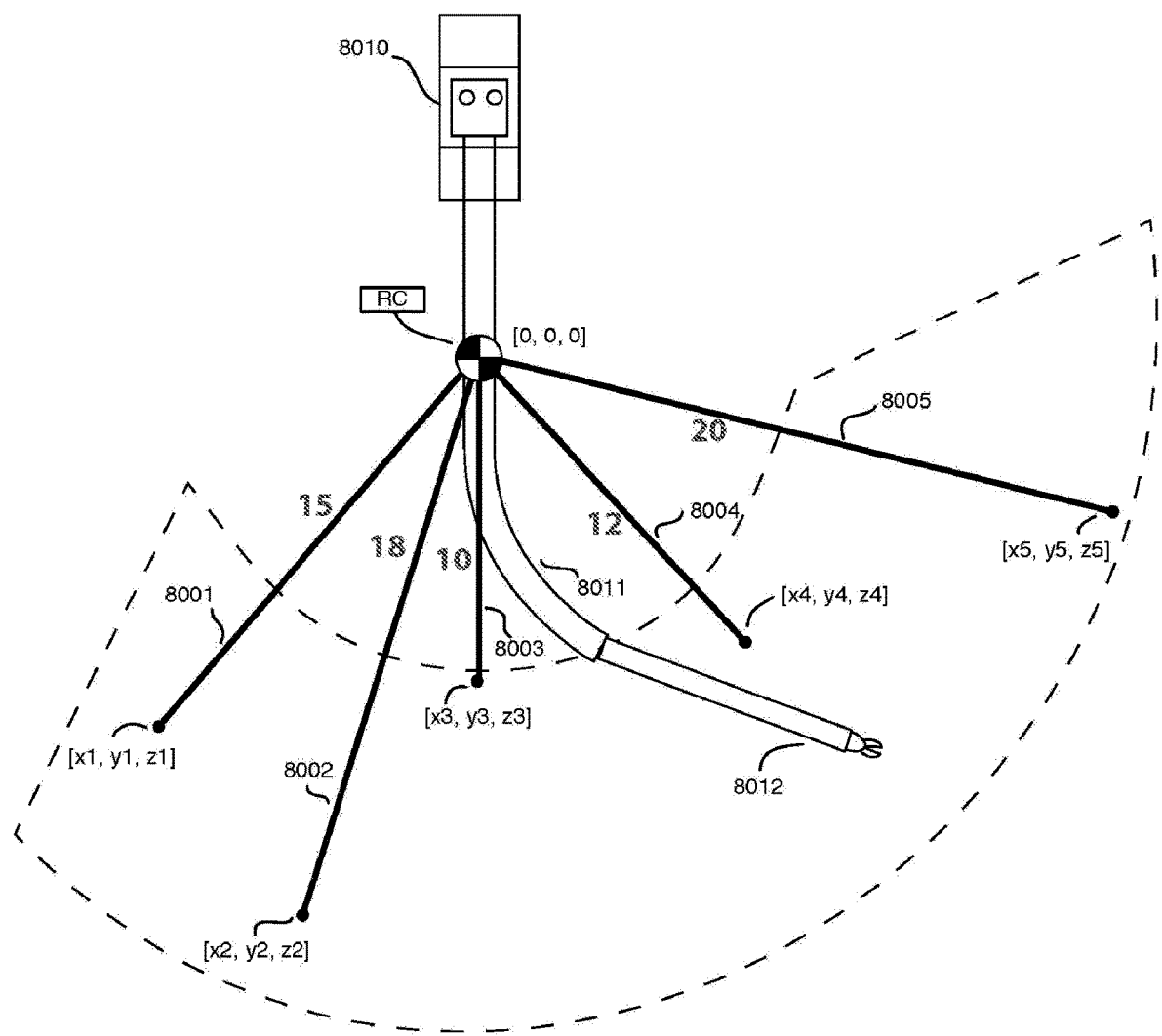
FIG. 8 illustrates sampled distance distributions of user specified points which are graphically displayed on a display of a robotic system utilizing aspects of the present invention.

In block 2009, the method causes information of the work site measurements to be graphically displayed on a display, such as the display 1020 of FIG. 1. As one example, FIG. 8 illustrates a three-dimensional distance map which is displayable on the display 1020. The distance map in this case indicates distances to each of the user specified sample points in the target reference frame. In this example, the target reference frame is the RCT reference frame with the RC point of the tool as its origin. Therefore, the distance to each of the sample points is equal to the magnitude of a vector extending from the origin to the sample point. For example, a graphical representation 8001 of a distance from the RC point to a first user specified point [x1, y1, z1] in the RCT reference frame of the tool is shown. Similarly, second, third, fourth, and fifth graphical representations 8002, 8003, 8004, and 8005 of distances from the RC point to their respective user specified points [x2, y2, z2], [x3, y3, z3], [x4, y4, z4], and [x5, y5, z5] are also shown. Adjacent each graphical representation of a distance is a magnitude of the distance. Concentric spheres, or parts thereof, may also be shown, such as by dotted lines, to provide a visual indication of the work site dimensions. Also shown is a graphical representation of a tool 8010 having a non-extendable portion 8011 and an extendable portion 8012. In this case, the non-extendable portion 8011 may represent the cannula 416b of FIG. 7 and the extendable portion 8012 may represent an instrument extending to its maximum extension out of the cannula 416b. The graphical representation of the tool 8010 may be pivotable about the RC point in response to user interaction with an input device, such as the input device 1031 of FIG. 1. The graphical representation of the extendable portion 8012 may also be adjustable (e.g., extendable and/or orientable) in response to user interaction with an input device, such as the input device 1032 of FIG. 1. A default graphical representation of the tool 8010 is preferably the optimal tool determined in block 2008. The user may also select among a plurality of candidate tools to identify which tool is to be graphically displayed at the time on the display. Such user selection may be performed, for example, by the user interacting with the GUI 1041 of FIG. 1 to select a tool by clicking on its displayed icon or selecting the tool from a displayed menu of tools.

Figure 9:
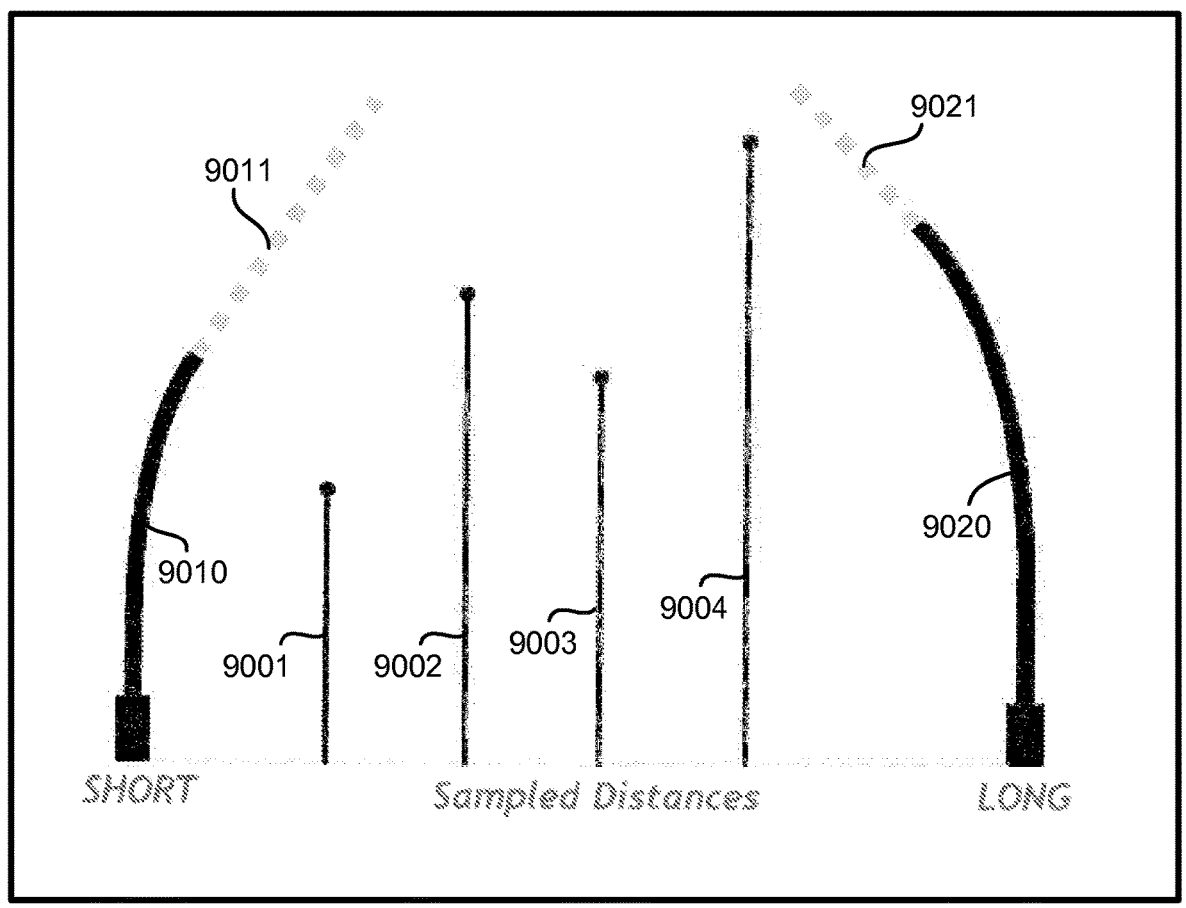
FIG. 9 illustrates a distance histogram of user selected points which is graphically displayed on a display of a robotic system utilizing aspects of the present invention.

As another example of work site measurements being graphically displayed on the display 1020, FIG. 9 illustrates a distance histogram which is displayable on the display 1020. The distance histogram in this case indicates distances in the target reference frame to each of the user specified sample points. For example, graphical representations 9001, 9002, 9003, and 9004 of a distance from the RC point to corresponding user specified points in the RCT reference frame of the tool are shown. Graphical representations of two candidate tools 9010 and 9020 are also shown. In this example, tool 9010 is designated as the short tool with its maximum extension indicated by dotted line 9011 and tool 9020 is designated as the long tool with its maximum extension indicated by dotted line 9021. Graphical representations of additional candidate tools may also be shown with the optimal tool highlighted in some fashion such as a different color, a different brightness, or a blinking representation.

Figure 3:
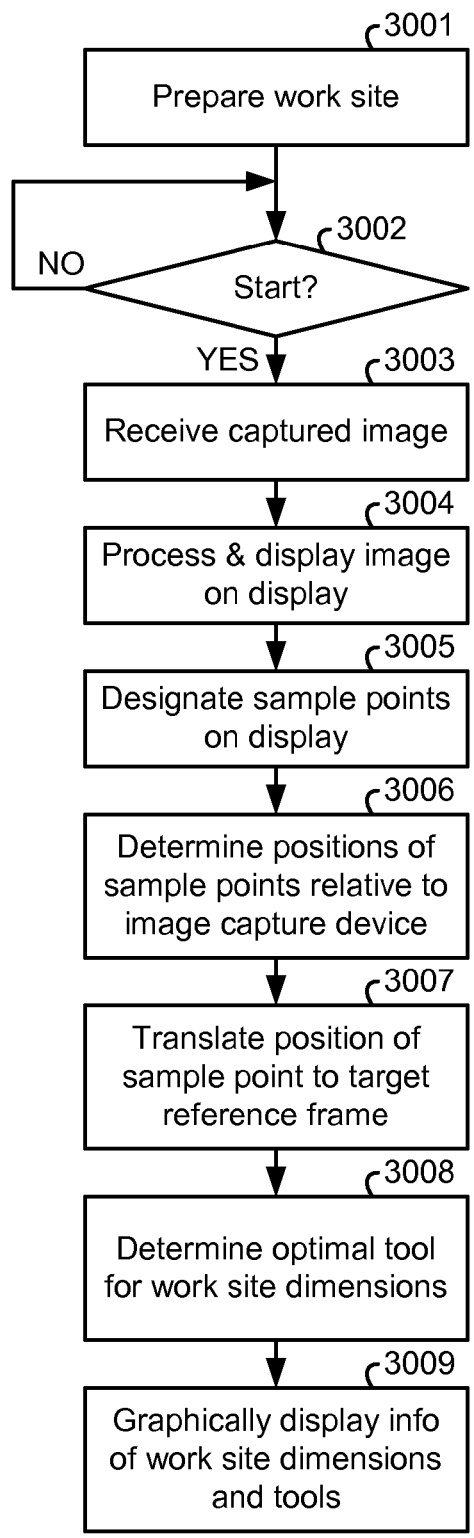
FIG. 3 illustrates a flow diagram of a second method utilizing aspects of the present invention for providing geometrically appropriate tool selection assistance for determined work site dimensions.

FIG. 3 illustrates, as an example, a flow diagram of an alternative method 3000 for providing work site measurements. Program code implementing various blocks of the method is stored non-transitorily in memory 1060 and executed by the processor 1030. Whereas the method 2000 of FIG. 2 involved the user sweeping the work site with the image capture device, the method 3000 of FIG. 3 involves processing stereo images with the image capture device stationary.

In block 3001, the method may optionally be initiated by a user preparing the work site, such as described in reference to block 2001 of FIG. 2. The method then proceeds to block 3002 in which it determines whether or not work site measurements are to start, such as described in reference to block 2002 of FIG. 2.

In block 3003, the method receives an image of a plurality of objects which has been captured by an image capture device such as image capture device 1010. When the image capture device is a stereoscopic camera, it is to be understood that the term "image" refers to a stereo pair of left and right images captured by the stereoscopic camera. On the other hand, if the image capture device is an ultrasound transducer, it is to be understood that the term "image" refers to a plurality of two-dimensional slices of the plurality of objects.

In block 3004, the method processes the captured image and causes the processed image to be displayed on a display such as the display 1020 of FIG. 1.

In block 3005, the method receives sample points which have been indicated by the user on the display. The user may indicate such sample points individually on the display or as all points in a region of interest on the display by, for examples, interacting with the GUI 1041, the telestrator 1042, or the gaze tracker 1043. As another example, the user may specify a region of interest by commanding movement of a cursor on the display 1020 by using the input device 1031 and providing an indication that an area circumscribed by the movement of the cursor is to be selected as the region of interest by clicking the input button 1033, which in this case may be on the user input device 1031. As still another example, the user may simply indicate each of the sample points by moving the cursor on the display so that it is over each of the sample points and clicking the button to indicate its selection.

In block 3006, the method determines the positions of the user specified sample points relative to an image capturing end of the image capture device by using a transform from a display reference frame to the "tip" reference frame of the image capture device. When the captured image received from the image capture device directly corresponds to the displayed image on the display, the mapping process may simply take into account the different resolutions of the image capture device and the display and any image calibration adjustments made to the captured image. When the displayed image results from processing of the captured image so as to alter its perspective, such as to provide a sense of telepresence, or to crop off a part of the captured image, the mapping process preferably takes into account such alterations in determining a transform $_{Display}^{Tip}T$ for mapping user specified sample points on the display to corresponding points in the "tip" reference frame of the image capture device.

In block 3007, the method translates the position of the user specified point relative to the image capturing end of the image capture device to another reference frame associated with a tool entry port into the work site, such as described in reference to block 2006 of FIG. 2.

In block 3008, the method determines an optimal tool for use in the work site based upon the work site measurements and the geometries of candidate tools, such as described in reference to block 2008 of FIG. 2.

In block 3009, the method causes information of the work site measurements to be graphically displayed on a display, such as described in reference to block 2009 of FIG. 2.

Although the various aspects of the present invention have been described with respect to a preferred embodiment, it will be understood that the invention is entitled to full protection within the full scope of the appended claims.

What is claimed is:

1. A medical system comprising:
   a stereo display; and
   a processor configured to:
   cause a stereo image of a work site to be displayed on the stereo display;

determine depth information for a region of interest in the stereo image of the work site;

determine a useful work space for each of a plurality of tools that may be used in the region of interest at the work site; and cause tool selection guidance information to be displayed on the stereo display, wherein the tool selection guidance information is based upon the depth information for the region of interest and the useful work space for each of the plurality of tools.

2. The medical system of claim 1,
wherein the plurality of tools comprises tools of varying geometries.

3. The medical system of claim 1,
wherein the plurality of tools includes a retractor.

4. The medical system of claim 1,
wherein the plurality of tools includes an insufflator.

5. The medical system of claim 1,
wherein the processor is further configured to:
determine the depth information for the region of interest by analyzing information of light reflected from one or more objects in the region of interest.

6. The medical system of claim 1, further comprising:
a stereoscopic camera that captures the stereo image of the work site;
wherein the processor is further configured to:
determine the depth information for the region of interest by analyzing the stereo image.

7. The medical system of claim 1, further comprising:
a graphical user interface adapted for user selection of the region interest.

8. The medical system of claim 1, further comprising:
a telestrator adapted for user selection of the region of interest.

9. The medical system of claim 1, further comprising:
a gaze tracker adapted for user selection of the region of interest.

10. The medical system of claim 1,
wherein the processor is further configured to:
receive indications of user selected points in the region of interest;
determine distances of the user selected points from an entry point of the region of interest; and
cause information of the distances of the user selected points to be graphically displayed on the stereo display by causing a three-dimensional distance map to be displayed on the stereo display, wherein the three-dimensional distance map indicates distances to the user selected points in a reference frame having the entry point as an origin of the reference frame.

11. The medical system of claim 10,
wherein the plurality of tools comprises tools of varying geometries; and
wherein the processor is further configured to:
cause graphical representations of the plurality of tools to be displayed on the display so as to indicate a reachability of each of the plurality of tools to the user selected points from the entry point.

12. The medical system of claim 1,
wherein the processor is further configured to:
receive indications of user selected points in the region of interest;
determine distances of the user selected points from an entry point of the region of interest; and
cause information of the distances of the user selected points to be graphically displayed on the stereo display by causing a distance histogram to be displayed on the stereo display, wherein the distance histogram includes the distances of the user selected points from the entry point.

13. The medical system of claim 12,
wherein the plurality of tools comprises tools of different geometries; and
wherein the processor is further configured to:
cause graphical representations of extendable lengths of the plurality of tools from the entry point to be displayed on the histogram for visual comparison to the distances to the user selected points from the entry point.

14. A method for providing work site measurements, the method comprising:
displaying a stereo image of a work site on a stereo display;
receiving indications of user selected points in a region of interest in the stereo image;
determining positions of the user selected points relative to an image reference frame having an origin collocated with an image capturing end of an image capture device that generated the stereo image;
translating the determined positions of the user selected points from the image reference frame to a target reference frame having an origin collocated with an entry point through which a tool at the work site enters the region of interest for performing a task in the region of interest; and
graphically displaying information of the translated positions of the user selected points on the stereo display so as to indicate distances of the user selected points from the entry point.

15. The method of claim 14, further comprising:
displaying information of a plurality of tools of varying geometries along with the information of the translated positions of the user selected points on the display, wherein a replacement tool is selectable among the plurality of tools so that the replacement tool may replace the tool currently extending into the region of interest through the entry point.

16. The method of claim 14, further comprising:
determining an optimal one of a plurality of tools for use at the work site according to the geometries of the plurality of tools and distances to the translated positions of the user selected points from the entry point; and
displaying an indication of the optimal one of the plurality of tools on the stereo display.

17. The method of claim 14,
wherein receiving the indications of the user selected points in the region of interest comprises:
receiving indications of the user selected points as the image capturing end of the image capture device is being directed towards different locations in the region of interest.

18. The method of claim 14, further comprising:
wherein receiving the indications of the user selected points in the region of interest comprises:
receiving indications of the user selected points from one of a graphical user interface, a telestrator, and a gaze tracker as a user viewing the stereo display interacts with the one of the graphical user interface, the telestrator, and the gaze tracker.

19. The method of claim 18,
wherein the indications of the user selected points comprise information of corresponding points in the stereo image being displayed on the stereo display.

20. The method of claim 19,
wherein determining positions of the user selected points relative to the image reference frame having the origin collocated with the image capturing end of the image capture device, comprises:
translating the corresponding points in the stereo image from a reference frame of the stereo display to the image reference frame.

* * * * *